United States Patent [19]

Inoue et al.

[11] Patent Number: 4,515,605
[45] Date of Patent: May 7, 1985

[54] SEPARATION PROCESS FOR A GAS MIXTURE

[75] Inventors: Takehisa Inoue, Tokyo; Kishio Miwa, Kamakura, both of Japan

[73] Assignee: Toray Industries, Incorporated, Japan

[21] Appl. No.: 211,250

[22] Filed: Nov. 28, 1980

[30] Foreign Application Priority Data

Dec. 7, 1979 [JP] Japan ............................... 54-158126

[51] Int. Cl.³ ............................................. B01D 53/04
[52] U.S. Cl. ........................................ 55/26; 55/62; 55/68; 55/75
[58] Field of Search .................. 55/25, 26, 58, 62, 68, 55/75

[56] References Cited

U.S. PATENT DOCUMENTS

| | | | |
|---|---|---|---|
| 3,564,816 | 2/1971 | Batta | 55/26 |
| 3,636,679 | 1/1972 | Batta | 55/26 |
| 3,738,087 | 6/1973 | McCombs | 55/58 |
| 3,796,022 | 3/1974 | Simon et al. | 55/25 |
| 3,797,201 | 3/1974 | Tamura | 55/62 |
| 4,070,164 | 1/1978 | Miwa et al. | 55/26 |
| 4,264,339 | 4/1981 | Juntgen et al. | 55/25 |

Primary Examiner—Robert Spitzer
Attorney, Agent, or Firm—Scully, Scott, Murphy & Presser

[57] ABSTRACT

Pressure swing selective adsorption-desorption process for separating at least one gaseous component from a gas mixture. In the adsorption step, a starting gas mixture is introduced at a pressure lower than that of a purge gas and, after completion of the adsorption step, at least a portion of the effluent gas from an adsorption column under execution of a purge is introduced into the adsorption column which has just completed the adsorption step and is about to enter upon the purge step, thereby pressurizing the latter adsorption column.

7 Claims, 2 Drawing Figures

SEPARATION PROCESS FOR A GAS MIXTURE

BACKGROUND OF THE INVENTION

This invention relates to a new pressure swing adsorption process for separating at least one component from a gas mixture. More particularly, it is concerned with an improvement in a separation process for a gas mixture, for example, in recovering or collecting nitrogen from air, which nitrogen is a selectively adsorbable component contained therein, by the use of an adsorbent such as zeolite.

As a separation process for a gas mixture there has heretofore been known the pressure swing adsorption process in which the following steps as fundamental steps are repeated successively in order, an adsorption step wherein a selectively adsorbable component contained in a gas mixture is selectively adsorbed on an adsorbent by an increase in pressure, a purge step wherein a purge gas enriched with the selectively adsorbable component is introduced onto the adsorbent to concentrate the selectively adsorbable component, and a desorption step wherein the gas enriched with the selectively adsorbable component is desorbed from the adsorbent with pressure reduction, (for example, see U.S. Pat. Nos. 3,797,201 and 4,070,164).

In such pressure swing adsorption process, in case a portion of the gas enriched with a selectively adsorbable component desorbed in the desorption step is recovered and the remaining portion is used as a purge gas in the purge step, it is necessary that the desorbed gas to be used as the purge gas should be increased in pressure at least up to the purge step pressure And once the said purge gas is introduced into an adsorption column for carrying out the purge step, a less selectively adsorbable component in the column is expelled and a gas enriched with the less selectively adsorbable component is discharged from the adsorption column. Although this effluent gas has substantially the same pressure as the purge gas, such pressure is not utilized at all, and this is the actual situation.

It is an object of this invention to provide an improved pressure swing adsorption process for separating a gas enriched with at least one selectively adsorbable gaseous component from a gas mixture.

It is another object of this invention to provide a more efficient separation process for a gas mixture by utilization of the pressure of an effluent gas.

Other objects and advantages of this invention will become apparent from the following description.

SUMMARY OF THE INVENTION

The above objects of this invention are attained by a separation process for a gas mixture using at least three adsorption columns each packed with an adsorbent having capacity to adsorb the more adsorbable component selectively and including successively repeated following steps as fundamental steps, an adsorption step for the gas mixture carried out by increasing pressure, a purge step using a purge gas enriched with the selectively adsorbable component and a desorption step carried out by reducing pressure, in which, in the adsorption step the starting gas mixture is introduced at a pressure lower than that of the purge gas and, after completion of the adsorption step, at least a portion of the effluent gas from an adsorption column under execution of the purge step is introduced into the adsorption column which has just completed the adsorption step and is about to enter upon the purge step, thereby pressurizing the latter adsorption column.

DETAILED DESCRIPTION OF THE INVENTION

Figure 1:
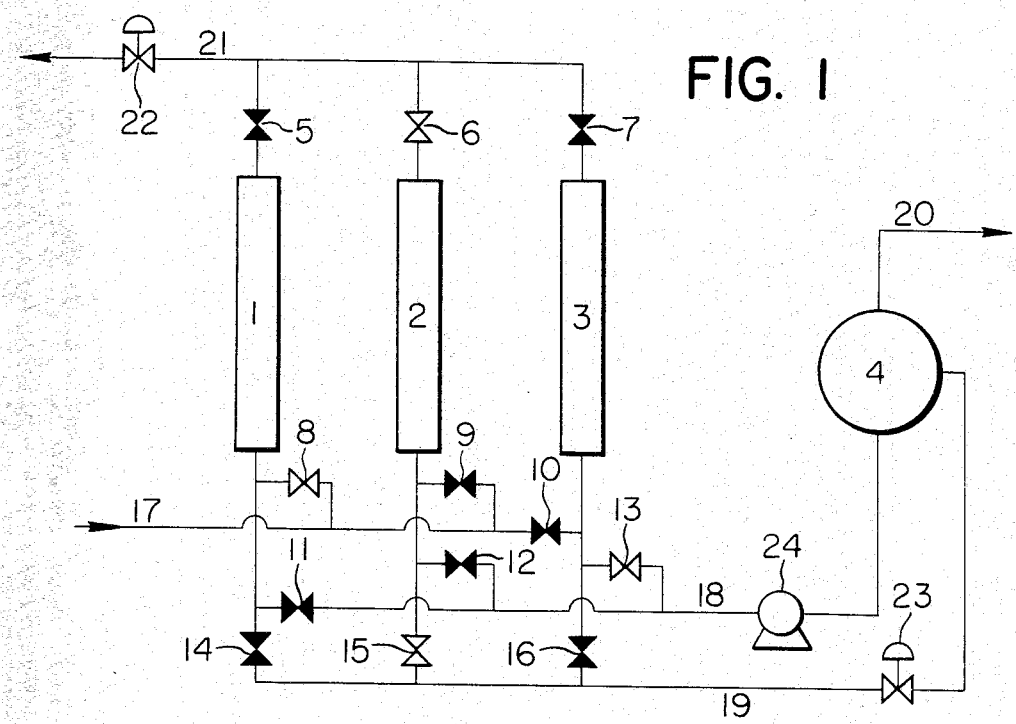

The process of this invention consists of at least an adsorption step, a purge step and a desorption step. These steps are conducted in separate adsorption columns at the same time, changing, in turn, the columns every given period of time. Thus, a gas enriched with at least one selectively adsorbable gas component is recovered continuously. Therefore, at least three adsorption columns are required for this purpose. The maximum number of columns is not limited because, if necessary, one additional operational step may be combined with these steps. Furthermore, the same operational step may be conducted in different columns at the same time.

For a more concrete illustration of the process of this invention, reference is here made to the most preferred application of the present process, that is, to the case where nitrogen as a selectively adsorbable component contained in the air is separated and recovered by the use of a zeolite adsorbent. Known zeolite adsorbents may be used, for example, type A, type X, type Y, mordenite, and clinoptilolite. Both synthetic and natural ones are employable, and as the case may be two or more of these zeolite adsorbents may be combined.

An adsorption column in which the adsorption step is over and the purge step is about to be started, begins to perform the purge step after being pressurized to about the same level as the purge gas pressure. In the process of this invention, the said pressurization is effected by introducing an effluent gas from an adsorption column under execution of the purge step into the adsorption column which has completed the adsorption step. In this case, the said effluent gas may be introduced from either side of the latter adsorption column, but when the oxygen concentration of the effluent gas is high, it is preferable that such effluent gas be introduced from the side opposite to the starting air inlet, and when the oxygen concentration of the effluent gas is low, it is preferable that each effluent gas be introduced from the starting air inlet side. And it is preferable that the gas discharged in the latter portion of the purge step is introduced into the adsorption column. The amount of the effluent gas to be introduced, which differs according to the gas mixture pressure or the introduction time, is preferably 5–50% and more preferably 10–40% of the gas discharged. The adsorption column which has been pressurized substantially up to the purge gas pressure in the above manner now starts to conduct the purge step. On the other hand, the adsorption column wherein the purge step is over begins to perform the desorption step in which a gas rich in nitrogen adsorbed on the adsorbent is desorbed by decreasing the pressure within the column.

Although the operating pressure for separating and recovering nitrogen in the air not limited, preferred pressures for practicing the process of this invention are such that the purge gas pressure is in the range of from 1.5 to 7 $kg/cm^2$·gauge, more preferably from 2 to 4 $kg/cm^2$·gauge, and that the starting air pressure is in the range of from atmospheric pressure to 5 $kg/cm^2$·gauge, more preferably from 0.5 to 3.5 $kg/cm^2$·gauge. If the pressure of the starting gas mixture is made too low, there occurs the necessity of increasing the required portion of the effluent gas to pressurize the adsorption column which has completed the adsorption step since there is fear that the purity of nitrogen recovered will become lower, although there is the advantage that the power required for compressing the said gas can be reduced. Therefore, the value of the starting air pressure is decided from the standpoint of economy of the entire process. Preferred difference between the purge gas pressure and the starting gas mixture pressure is about 0.5 to 3.0 kg/cm². A preferred final desorption pressure in this invention is 70 to 760 torr.

Typical embodiments of this invention are described below with reference to the accompanying drawings, but it is to be understood that the process of this invention is not limited thereto.

Figure 2:
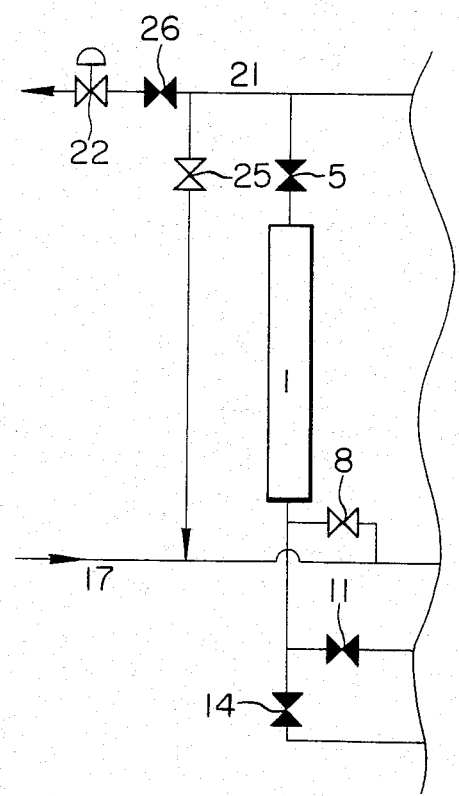

In the drawings,

FIG. 1 is a schematic flowsheet showing an example of an apparatus for separating nitrogen from air, and FIG. 2 is a partial flowsheet showing a modification of FIG. 1.

In FIG. 1, there are disposed three (1 to 3) adsorption columns each packed with an adsorbent. Air which has been pressurized to a higher pressure than the atmospheric pressure is fed through a gas mixture inlet pipe 17 and a valve 8 into an adsorption column 1 which has completed the desorption step (the compressor for pressurizing the air is here not shown). At this moment, valves 5, 11 and 14 are closed and the adsorption column 1 is conducting the adsorption step by virtue of increased pressure. In the drawings, black and white valves indicate closed and open conditions, respectively.

Into an adsorption column 2 which has already completed the adsorption step is fed a purge gas through a purge gas inlet pipe 19 and a valve 15. The effluent gas containing oxygen which has been washed away by the purge gas is conducted through a valve 6 to an effluent gas outlet pipe 21. The internal pressure of the adsorption column 2 is maintained at a predetermined value by a pressure control valve 22. At this moment, valves 9 and 12 are closed and the adsorption column 2 is in the purge step.

Nitrogen gas whose purity has been increased by the purge step flows out of an adsorption column 3 which has completed the purge step, and is desorbed by suction by means of a compressor 24 through a valve 13 and a desorbed gas outlet pipe 18. At this moment, valves 7, 10 and 16 are closed and the adsorption column 3 is in the desorption step. The desorbed gas is pressurized to the purge step pressure or higher by the compressor 24 and is conducted to a surge tank 4, where a portion of the desorbed gas is withdrawn as a product gas from a product gas outlet pipe 20, while the remaining gas passes through a reducing valve 23 and is conducted to the purge gas inlet pipe 19 for use as a purge gas.

Then, by advancing the valve opening/closing sequence to the following state, the adsorption columns 1, 2 and 3 shift to the purge step, desorption step and adsorption step, respectively. If this sequence is set before hand so as to advance at certain time intervals, it is possible to separate and recover nitrogen continuously from air.

In working the process of this inventipn, in the condition shown in FIG. 1 the adsorption step in the adsorption column 1 is brought to an end before termination of the purge step (in the adsorption column 2), then the valves 22 and 8 are closed and the valve 5 is opened to pressurize the interior of the adsorption column 1 up to substantially the purge step pressure in the adsorption column 2. Alternatively, such pressurization may be effected by connecting between the effluent gas outlet pipe 21 and the gas mixture inlet pipe 17 through the medium of an additional valve 25, as is illustrated in FIG. 2. In this case, the valves 5 and 26 are closed, while the valves 8 and 25 are open, and the interior of the adsorption column 1 is pressurized. In FIG. 2, the valve 25 is closed and 26 is open except when the adsorption column which has completed the adsorption step is pressurized with the effluent gas.

According to the process of this invention, the pressure of the effluent gas discharged in the purge step is utilized whereby the pressure of the starting gas mixture can be set low, so the power required for compressing the said gas can be reduced, and further the amount of the gas mixture to be fed to the adsorption columns decreases and the recovery of a selectively adsorbable gaseous component is improved.

Thus in the separation and recovery of a selectively adsorbable component contained in a gas mixture, an effluent gas enriched with a less selectively adsorbable component as an impurity is introduced into an adsorption column, and this results in a decreased concentration of the selectively adsorbable component within the said column; nevertheless, as is apparent from a working example of the invention as will be described hereinafter, there is little or only a slight reduction in the purity of the recovered nitrogen.

A working example of this invention is given below to further illustrate the invention.

EXAMPLE

In the apparatus and flowsheet shown in FIG. 1, the adsorption columns 1, 2 and 3 were each packed with about 15 kg. of a Ca substituted synthetic zeolite A (10–16 mesh) which had been calcined to 500° C. Through the gas mixture inlet pipe 17 was introduced air from which had been removed moisture and carbon dioxide in advance. On the other hand, through the purge gas inlet pipe 19 was fed a purge gas as a portion of desorbed gas at a pressure of 3 kg/cm²·gauge and at a flow rate of 4.3 Nm³/hr. In the desorption step, the presure within the adsorption column under execution of the desorption step by the compressor 24 was dropped from 3 kg/cm²·gauge to 230 torr in about 3 minutes, and the desorbed gas was recovered. The desorbed gas recovered through the product gas outlet pipe 20 was about 1.7 Nm³/hr.

Under the above operational conditions, the adsorption step was conducted with varying pressures of the starting air, then the adsorption column which had completed the said adsorption step was pressurized with the effluent gas from the column under execution of the purge step up to a level almost equal to the pressure of such effluent gas. In this operation, the valve opening or closing was adjusted so that the effluent gas discharged in the latter portion of the purge step pressurized the adsorption column wherein the adsorption step was over. That is, in each adsorption column the purge step and the desorption step are each performed for a period of 3 minutes, while the adsorption step is brought to an end within 3 minutes and the remaining time interval up to 3 minutes is utilized for execution of the pressurization with the effluent gas.

The above procedure was repeated continuously and cyclically, and nitrogen was recovered. Table 1 below shows the relation between the recovered nitrogen and the starting air pressure.

TABLE 1

| Experiment No. | Starting Air Pressure ($kg/cm^2 \cdot gauge$) | Purity of Recovered Nitrogen (mol %) |
|---|---|---|
| 1 | 2 | 99.9 |
| 2 | 1.5 | 99.7 |
| 3 | 1.0 | 99.1 |

Thus, according to the process of this invention wherein the adsorption step is performed at a lower pressure of the starting air than the purge gas pressure, not only a high-purity nitrogen is obtained but also the cost of electric power can be saved since the starting air pressure may be held low, resulting in that the running cost can be reduced. For example, in the case of Experiment No. 1, as compared with the case where the starting air pressure is set at the same level as the Iurge gas pressure (3 $kg/cm^2 \cdot gauge$), the compression ratio for the startirg air can be reduced from 4 to 3, and this is very economical.

We claim:

1. In a separation process for a gas mixture using at least three adsorption columns each packed with an adsorbent having capacity to adsorb a selectively adsorbable component contained in the gas mixture and involving successively repeated following steps as fundamental steps, an adsorption step for the gas mixture carried out by increasing pressure, a purge step using a purge gas enriched with the selectively adsorbable component and a desorption step carried out by reducing pressure; the improvement characterized in that in the adsorption step the starting gas mixture is introduced at a pressure lower than that of the purge gas and, after completion of the adsorption step, at least a portion of the effluent gas from an adsorption colnmn under execution of the purge step is introduced into the adsorption column which has just completed the adsorption step and is about to enter upon the purge step, thereby pressurizing the latter adsorption column.

2. The process as defined in claim 1, in which said gas mixture is air.

3. The process as defined in either claim 1 or claim 2, in which said adsorbent is a zeolite.

4. The process as defined in claim 1, in which the pressure of said purge gas is in the range of from 1.5 to 7 $kg/cm^2 \cdot gauge$, the pressure of said starting gas mixture is in the range of from atmospheric pressure to 5 $kg/cm^2 \cdot gauge$, and the difference of both said pressures is in the range of from 0.5 to 3.0 $kg/cm^2$.

5. The process as defined in claim 1, in which said effluent gas is introduced into the adsorption column which has completed the adsorption step from the starting gas mixture introducing side thereof.

6. The process as defined in claim 1, in which said effluent gas to be introduced into the adsorption column which has completed the adsorption step is the gas discharged in the latter portion of the purge step.

7. The process as defined in claim 1, in which the amount of said effluent gas to be introduced into the adsorption column which has completed the adsorption step and is about to enter upon the purge step, is in the range of from 5 to 50% by volume of the entire effluent gas.

* * * * *